(12) United States Patent
Uranishi (10) Patent No.: US 8,297,849 B2
(45) Date of Patent: Oct. 30, 2012

(54) ROLLER BEARING

(75) Inventor: Takeharu Uranishi, Habikino (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 309 days.

(21) Appl. No.: 12/733,123

(22) PCT Filed: Aug. 8, 2008

(86) PCT No.: PCT/JP2008/064345
§ 371 (c)(1),
(2), (4) Date: Feb. 12, 2010

(87) PCT Pub. No.: WO2009/020215
PCT Pub. Date: Feb. 12, 2009

(65) Prior Publication Data
US 2010/0158422 A1 Jun. 24, 2010

(30) Foreign Application Priority Data
Aug. 9, 2007 (JP) ................. P2007-207399

(51) Int. Cl.
*F16C 33/66* (2006.01)
(52) U.S. Cl. .................... 384/475; 384/467; 384/474
(58) Field of Classification Search .............. 384/467, 384/472–475, 477, 548
See application file for complete search history.

(56) References Cited

U.S. PATENT DOCUMENTS

| 3,350,147 | A | * | 10/1967 | Hingley | 384/472 |
|---|---|---|---|---|---|
| 4,194,797 | A | * | 3/1980 | Hormann et al. | 384/467 |
| 4,974,972 | A | * | 12/1990 | Boosler et al. | 384/447 |
| 5,125,756 | A | * | 6/1992 | Bossler, Jr. | 384/572 |
| 5,503,480 | A | * | 4/1996 | Caillaut et al. | 384/477 |
| 6,227,713 | B1 | * | 5/2001 | Neder et al. | 384/486 |
| 6,241,396 | B1 | * | 6/2001 | Shimomura et al. | 384/477 |
| 6,428,212 | B1 | * | 8/2002 | Tanaka | 384/475 |
| 6,511,228 | B2 | * | 1/2003 | Dusza | 384/475 |
| 6,732,600 | B2 | * | 5/2004 | Greubel | 74/89.44 |
| 7,044,643 | B2 | * | 5/2006 | Greubel | 384/462 |
| 7,625,127 | B2 | * | 12/2009 | Foti et al. | 384/544 |

FOREIGN PATENT DOCUMENTS

DE    4142802 A1    7/1993
(Continued)

OTHER PUBLICATIONS

European Search Report dated Apr. 27, 2012.

*Primary Examiner* — Marcus Charles
(74) *Attorney, Agent, or Firm* — McGinn IP Law Group, PLLC (57) ABSTRACT

An inner ring is formed with an oil hole extending through a part between an inner ring raceway surface and an inner peripheral face thereof, and configured to force out grease, which has been supplied to an area between the inner ring raceway surface and an outer ring raceway surface, to the inner peripheral face in accordance with rolling of cylindrical rollers. The inner peripheral face of the inner ring is formed with a plurality of V-shaped inclined grooves configured to guide the grease, which has been forced out to the inner peripheral face of the inner ring through the oil hole, to opposite end portions of the inner peripheral face in an axial direction of the inner ring.

9 Claims, 5 Drawing Sheets

FOREIGN PATENT DOCUMENTS

| | | |
|---|---|---|
| DE | 10 2005 029 075 A1 | 12/2006 |
| GB | 2262785 B | 6/1993 |
| JP | 62-147722 | 9/1987 |
| JP | 62-194241 | 12/1987 |
| JP | 63-157522 | 10/1988 |
| JP | 11141555 A * | 5/1999 |
| JP | 2002-266877 A | 9/2002 |
| JP | 2004-036757 A | 2/2004 |
| JP | 2005-76746 | 3/2005 |
| JP | 2008240778 A * | 10/2008 |

* cited by examiner

ROLLER BEARING

CROSS-REFERENCE TO RELATED APPLICATIONS

The entire disclosure of Japanese Patent Application No. 2007-207399, and under the Patent Cooperation Treaty from International Application No. PCT/JP2008/064345, filed on Aug. 8, 2008 including specification, claims, drawings and abstract is incorporated herein by reference in its entirety.

BACKGROUND OF THE INVENTION

1. Technical Field

The present invention relates to a roller bearing for supporting rolls in a rolling installation and a continuous casting installation, for example.

2. Background Art

A large number of rolls including work rolls, backup rolls, etc., are used in a rolling installation. A large number of rolls are used also in a continuous casting installation. These rolls are rotatably supported by roller bearings provided at their opposite ends. This roller bearing comprises: an inner ring fitted on a journal portion formed at roll end portion; an outer ring fixed on and supported by an installation-side housing (bearing box); and a number of rolling elements interposed between the inner ring and the outer ring.

In the above installation, since a large number of the rolls are used, the number of the roller bearings provided for supporting them is also large accordingly. Therefore, for example, when performing the maintenance operation of the above installation, a great labor for detaching the large number of roller bearings is required. Therefore, in order to enhance the maintenance workability, the journal portion is clearance-fitted with the inner ring of the roller bearing so that the roller bearing can be easily detached from the roll.

In the case where the inner ring of the roller bearing and the journal portion of the roll are clearance-fitted with each other, a so-called creep in which the journal portion and the inner ring rotate relative to each other is liable to occur. And besides, it is not premised that an outer peripheral face of the journal portion of the roll and an inner peripheral face of the inner ring slidingly move relative to each other, and therefore sufficient lubrication environment is not secured. Therefore, there has been encountered a problem that the journal portion of the roll and the inner peripheral face of the inner ring are much worn.

Therefore, there has been proposed a roller bearing in which a spiral groove for supplying grease between an outer peripheral face of a journal portion (roll neck shaft) of a roll and an inner peripheral face of an inner ring is formed on the inner peripheral face of the inner ring (see Japanese Utility Model Publication No. 62-147722 U).

Figure 5:
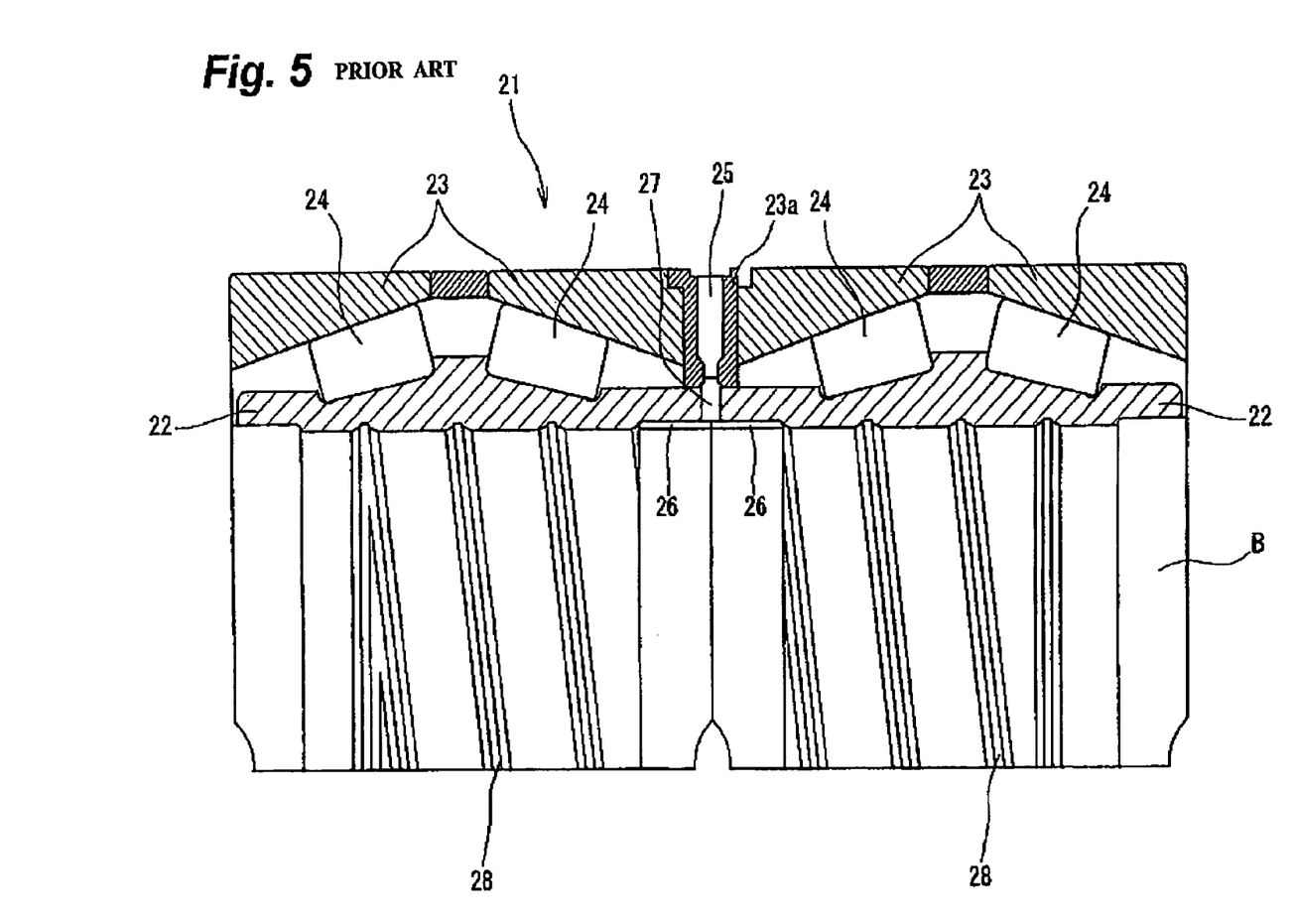
FIG. 5 is a section view showing a conventional multi-row conical roller bearing.

FIG. 5 shows a roller bearing in which such a spiral groove is formed.

As shown in FIG. 5, this conventional roller bearing which is a multi-row conical roller bearing 21 comprises: a pair of inner rings 22 having inner peripheral faces to which a roll neck shaft B is inserted; two pairs of outer rings 23 disposed in an outside of the inner ring 22 in the radial direction of the inner rings 22; a spacer 23a interposed between the two adjacent outer rings 23 disposed at a center part in the axial direction of the roller bearing 21; a plurality of conical rollers 24 rotatably disposed between each inner ring 22 and each outer ring 23; an oil supplying hole 25 formed through the spacer 23a; annular recessed portions 26 formed between the pair of inner rings 22 and the roll neck shaft B at the center part in the axial direction of the roller bearing 21; an oil groove 27 communicating the recessed portions 26 with the oil supplying hole 25; and spiral grooves 28 formed respectively in the inner peripheral faces of the inner rings 22 and extending with a plurality of turns from the recessed portions 26 respectively toward opposite end portions in the axial direction of the roller bearing 21.

In the above roller bearing, grease is supplied to the oil supplying hole 25 from the exterior thereof, and this supplied grease in the oil supplying hole 25 is supplied to the spiral grooves 28 via the oil groove 27 and the recessed portions 26. As a result, contact faces between the roll neck shaft B and the pair of inner rings 22 are lubricated by the grease.

SUMMARY OF THE INVENTION

Problem to be Solved by the Invention

In the above conventional roller bearing, the length of the spiral groove 28 formed along the inner peripheral face of the inner ring 22 is long, and therefore in order to supply the grease, which is supplied to the recessed portion 26, from one end of the spiral groove 28 (communicating with this recessed portion 26) to the other end thereof, an apparatus for supplying the grease under high pressure (high-pressure grease supplying apparatus) is needed.

And besides, the high-pressure grease supplying apparatus is needed for each of a large number of rolls, and therefore there have been encountered problems that the installation becomes complicated and that the cost of the installation increases.

The present invention has been made in view of these circumstances, and an object thereof is to provide a roller bearing in which grease can be supplied between an inner peripheral face of an inner ring and a rotary shaft with a simple and inexpensive structure.

How to Solve the Problem

In order to achieve the above object, according to the invention, there is provided a roller bearing, comprising:

an inner ring, having an outer peripheral face provided with an inner ring raceway surface and an inner peripheral face adapted to be clearance-fitted with a rotary shaft;

an outer ring, disposed coaxially with the inner ring at an outside in a radial direction of the inner ring, the outer ring having an inner peripheral face provided with an outer ring raceway surface; and a plurality of rollers, rollably disposed between the inner ring raceway surface and the outer ring raceway surface, wherein:

the roller bearing is so configured that grease is supplied to an area between the inner ring raceway surface and the outer ring raceway surface;

the inner ring is formed with an oil hole extending through a part between the inner ring raceway surface and the inner peripheral face of the inner ring, and configured to feed the grease, which has been supplied to the area between the inner ring raceway surface and the outer ring raceway surface, to the inner peripheral face of the inner ring in accordance with rolling of the rollers; and the inner peripheral face of the inner ring is formed with a plurality of lubrication grooves configured to guide the grease, which has been fed to the inner peripheral face of the inner ring through the oil hole, to opposite end portions of the inner peripheral face in an axial direction of the inner ring.

In the roller bearing of the above construction, as the rollers roll on the inner ring raceway surface, the grease supplied to the area between the inner ring raceway surface and the outer ring raceway surface is pressed by the rollers. The grease is forced out to the inner ring inner peripheral face through the oil hole, and is delivered to the area between the inner peripheral face of the inner ring and the rotary shaft. The grease supplied to the area between the inner peripheral face of the inner ring and the rotary shaft is delivered to the lubrication grooves formed in the inner peripheral face of the inner ring, and is guided toward the opposite ends of the inner peripheral face in the axial direction of the inner ring.

Thus, the roller bearing of this invention has such a structure that by pressing the grease by the rolling rollers, this grease can be supplied to the area between the inner peripheral face of the inner ring and the rotary shaft. Therefore, a high-pressure grease supplying apparatus heretofore required becomes unnecessary.

As a result, the lubricated condition between the inner peripheral face of the inner ring and the rotary shaft can be suitably maintained with the simple and inexpensive structure.

In the above roller bearing, it is preferable that: the lubrication grooves are inclined grooves each having two portions extending toward the opposite ends of the inner peripheral face in the axial direction of the inner ring while being inclined relative to a generatrix of the inner peripheral face of the inner ring from an origin part located at a position corresponding to a position in the axial direction of the inner ring where the oil hole is formed; and the inclined grooves are arranged with a predetermined interval in a circumferential direction of the inner peripheral face of the inner ring while being directed to the same direction.

The inner ring is mounted on the rotary shaft in such a manner that the inclined grooves extend in a forward direction with respect to a rotational direction of the rotary shaft, that is, distal ends of the two portions (disposed respectively at the opposite end portions of the inner peripheral face of the inner ring) are directed to the rotational direction of the rotary shaft with respect to the origin part. With this configuration, the grease supplied to the area between the rotary shaft and the inner ring can be efficiently flowed from the origin part toward the distal ends of the inclined groove in accordance with a relative rotation of the rotary shaft and the inner ring occurred due to the creep. Therefore, the grease can be efficiently supplied to the inner periphery of the inner ring entirely in the axial direction thereof, so that the lubricated condition between the inner ring inner peripheral face and the rotary shaft can be more suitably maintained. Accordingly, the outer peripheral face of the rotary shaft and the inner peripheral face of the inner ring can be more effectively restrained from being worn by the creep.

In the above roller bearing, it is preferable that: the oil hole is formed at a center part in the axial direction of the inner ring; and the inclined grooves extends symmetrically toward the opposite end portions in the axial direction of the inner ring from the center part in the axial direction of the inner ring as the origin part.

In this case, the grease fed to the inclined groove through the oil hole can be delivered almost uniformly from the center part of the inner periphery in the axial direction of the inner ring toward the opposite end portions in the axial direction of the inner ring. Accordingly, the grease can be supplied uniformly to the inner periphery of the inner ring entirely in the axial direction. Therefore, the outer peripheral face of the rotary shaft and the inner peripheral face of the inner ring can be more effectively restrained from being worn by the creep.

Advantage of the Invention

In the roller bearing of the present invention, grease can be supplied to the area between the inner peripheral face of the inner ring and the rotary shaft with the simple and inexpensive structure without the need for a conventional high-pressure grease supplying apparatus.

DETAILED DESCRIPTION OF THE INVENTION

Best Mode for Carrying out the Invention

Next, preferred embodiments of the present invention will be described with reference to the accompanying drawings. In the following description, explanation will be made of an illustration in which the present invention is applied to a roller bearing for rolls of a continuous casting installation.

Figure 1:
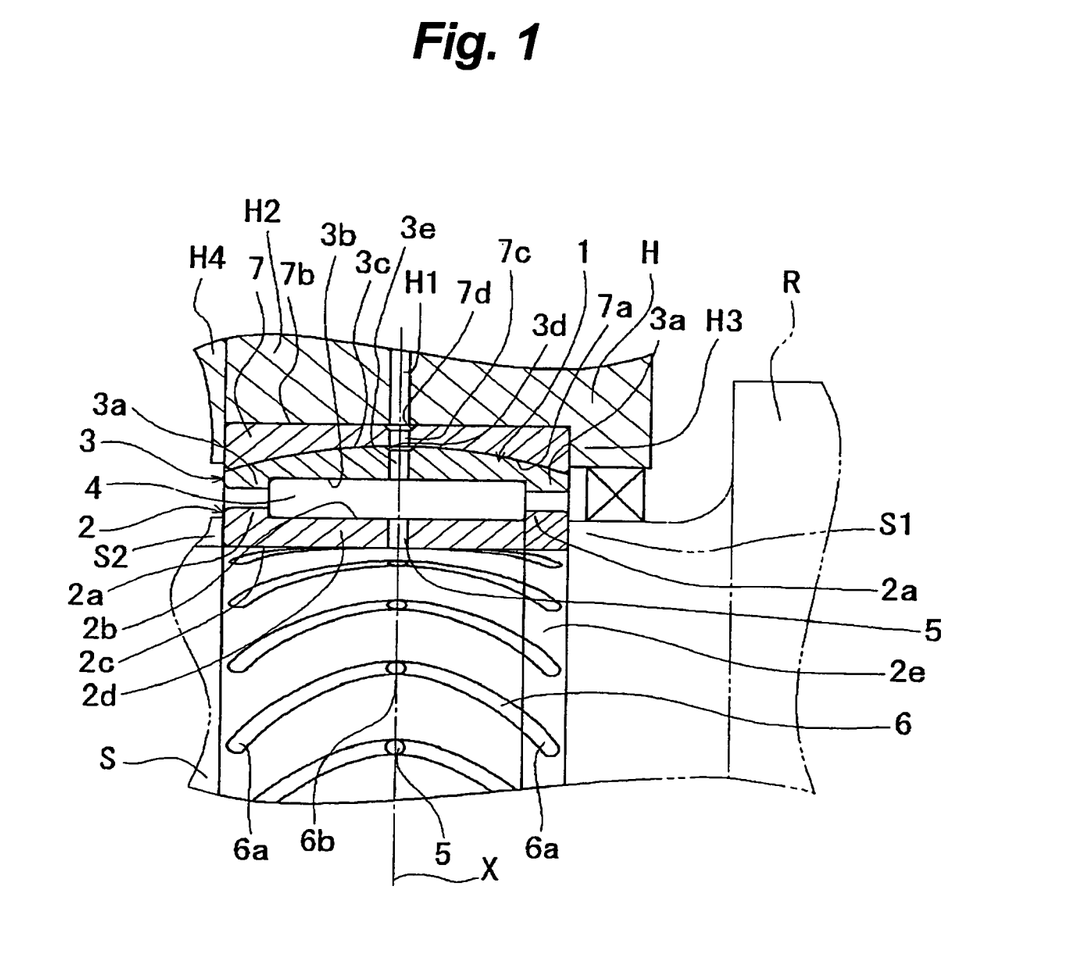
FIG. 1 is a section view showing a main part of a roller bearing according to one embodiment of the present invention.

FIG. 1 is a section view of a main part of the roller bearing 1 according to one embodiment of the present invention. This roller bearing 1 is mounted on a journal portion S formed at one end portion of a roll R serving as a rotary shaft, to rotatably support the roll R.

The roller bearing 1 is fixed to a housing H provided in the continuous casting installation side for holding the roller bearing 1, and supports the roll R. The roller bearing 1 comprises: an inner ring 2 having an inner peripheral face side to which the journal portion S is inserted; an outer ring 3 concentrically disposed in an outside of the inner ring 2 in the radial direction of the inner ring 2; a plurality of cylindrical rollers 4 disposed between the inner ring 2 and the outer ring 3; a plurality of oil holes 5 formed in the inner ring 2; a plurality of inclined grooves 6 formed in an inner peripheral face 2c of the inner ring 2 and serving as lubrication grooves; and an aligning housing ring 7 slidably fitted on an outer peripheral face of the outer ring 3. The roller bearing 1 is a full complement roller bearing with no cage. Sealing devices which are fixed to the housing H and are disposed in sliding contact with the roll R or annular members fixed to the roll R in a manner to allow the rotation thereof are disposed respectively at opposite sides of the roller bearing 1 in the axial direction thereof.

A inner ring raceway surface 2b for allowing the cylindrical rollers 4 to roll thereon is formed at the outer periphery of the inner ring 2, and a pair of ribs 2a for regulating the axial movement of the cylindrical rollers 4 are formed in continuous relation respectively to opposite end portions of the raceway surface 2b in the axial direction of the inner ring 2. One of the pair of ribs 2a is formed by a loose rib 2e affixed to a body 2d of the inner ring 2. In this embodiment, widths of the pair of ribs 2a in the axial direction of the inner ring 2 are equal to each other, and the center of the inner ring raceway surface 2b in the axial direction of the inner ring 2 is disposed on a central line X in the axial direction of the roller bearing 1.

An inner diameter of the inner peripheral face 2c of the inner ring 2 is set to such a value that can establish a clearance fitting with respect to an outer diameter of the inserted journal portion S. Opposite end faces in the axial direction of the inner ring 2 respectively oppose a step S1 formed at the journal portion S and a fixing member S2 fixed to the journal portion S, so that the inner ring 2 is interposed between the step portion S1 and the fixing member S2 with clearances.

Ribs 3a for regulating the axial movement of the cylindrical rollers 4 are formed respectively at opposite end portions of an inner peripheral face of the outer ring 3, and a outer ring raceway surface 3b for allowing the cylindrical rollers 4 to roll thereon is formed between the two ribs 3a. An outer peripheral face 3c of the outer ring 3 is shaped into a spherical face. An inner peripheral face 7a of the aligning housing ring 7 is shaped into a spherical face which has a radius generally equal to or slightly larger than a radius of the spherical face of the outer peripheral face 3c of the outer ring 3. The outer peripheral face 3c of the outer ring 3 is slidably fitted with the inner peripheral face 7a of the aligning housing ring 7. An outer peripheral face 7b of the aligning housing ring 7 is fitted in an inner peripheral face of the housing H, and is fixed to this housing H. The housing H includes a housing body H2 to which the outer peripheral face 7b of the aligning housing ring 7 is fitted, and a lid H4. The aligning housing ring 7 is fixed in the axial direction by a step portion H3 and the lid H4 of the housing body H2. Further, an annular groove 3d slightly recessed inward in the radial direction of the outer ring 3 is formed in a central portion of the outer peripheral face 3c in the axial direction of the outer ring 3, and extends along the circumferential direction of the outer peripheral face 3c. A plurality of holes 3e communicating the bottom of the groove 3d and the outer ring raceway face 3b are formed and arranged at a predetermined interval along the groove 3d.

The width of the outer ring 3 in the axial direction thereof is equal to the width of the inner ring 2 in the axial direction thereof, and the widths of the pair of ribs 3a formed respectively at the opposite end portions in the axial direction of the outer ring 3 are equal to each other. The center of the outer ring raceway surface 3b in the axial direction of the outer ring 3 is disposed on the central line X in the axial direction of the roller bearing 1.

An annular groove 7d slightly recessed inward in the radial direction of the aligning housing ring 7 is formed in a center part of the outer peripheral face 7b in the axial direction of the aligning housing ring 7, and extends along the circumferential direction of the outer peripheral face 7b. A plurality of holes 7c communicating the bottom of the groove 7d and the inner peripheral face 7a are formed and arranged at a predetermined interval along the groove 7d. Grease is supplied to the groove 7d of the aligning ring 7, for example, from a grease supplying path H1 formed in the housing H. The grease supplied to this groove 7d is delivered to the groove 3d of the outer ring 3 through the holes 7c. The grease supplied to this groove 3d is further delivered to an area between the inner ring raceway surface 2b and the outer ring raceway surface 3b through the holes 3e. As a result, the area between each of the two raceway surfaces 2b, 3b and the cylindrical rollers 4 is lubricated.

Outer peripheral faces of the plurality of cylindrical rollers 4 serve as rolling contact surfaces 4a disposed in rolling contact with the inner ring raceway surface 2b and the outer ring raceway surface 3b. The cylindrical rollers 4 are disposed between the inner ring raceway surface 2b and the outer ring raceway surface 3b, and are slightly spaced from one another in the circumferential direction (see FIG. 2).

The plurality of oil holes 5 formed in the inner ring 2 are provided at the center part of the inner ring 2 in the axial direction thereof, that is, at the center part of the inner ring raceway surface 2b in the axial direction of the inner ring 2, and extend through the inner ring 2 between this inner ring raceway surface 2b and the inner peripheral face 2c. The plurality of oil holes 5 are arranged with a constant interval along the circumferential direction of the inner ring 2. The axes of the oil holes 5 extend in the radial direction of the inner ring 2.

Figure 2:
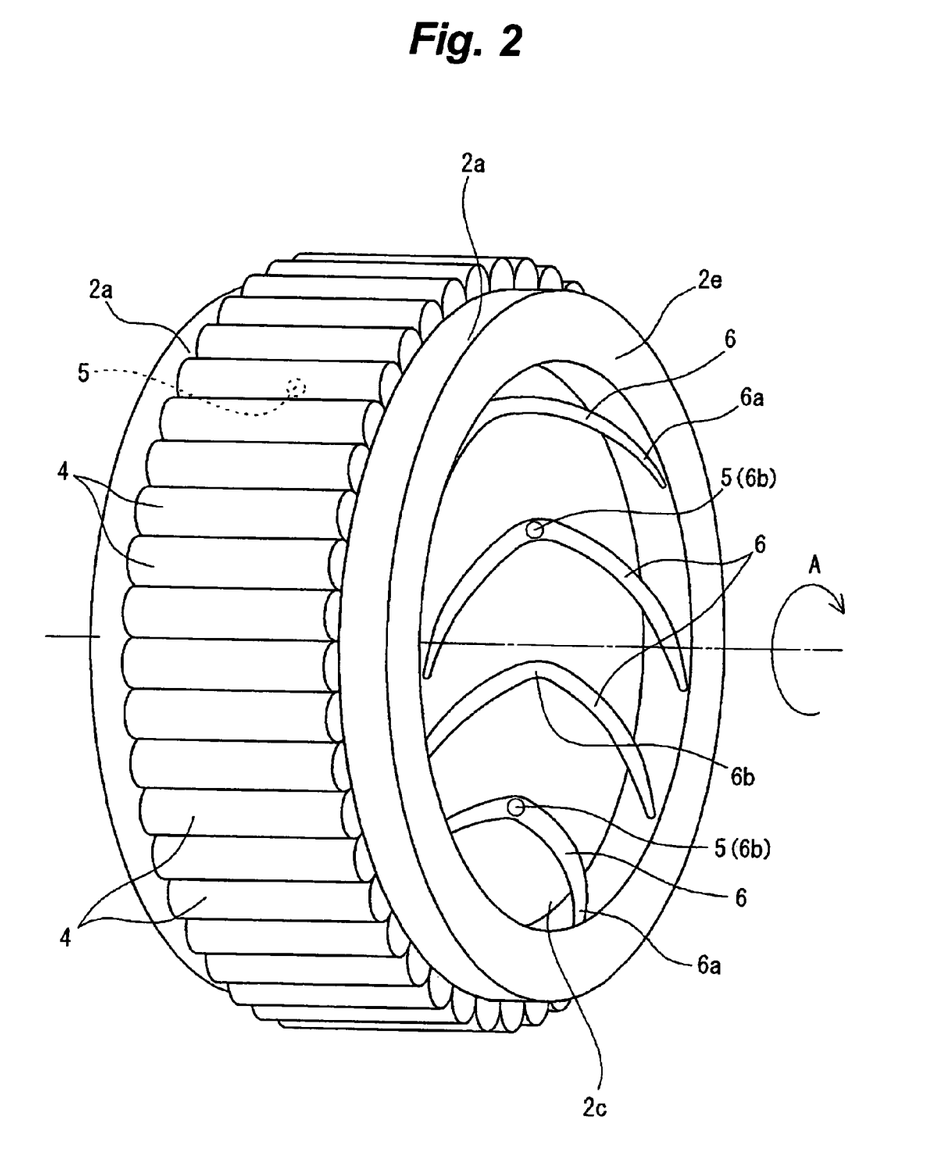
FIG. 2 is a perspective view showing an inner ring and cylindrical rollers of the roller bearing of the embodiment.

As shown also in FIG. 2, each inclined groove 6 formed on the inner peripheral face 2c of the inner ring 2 has an origin part 6b located at a position corresponding to a position in the axial direction of the inner ring where the oil hole 5 is formed, and extends toward opposite end portions of the inner peripheral face 2c while being inclined relative to the generatrix of the inner peripheral face 2c, thereby forming a V-shaped appearance. In this embodiment, since the oil hole 5 is formed at the center part in the axial direction of the inner ring 2, the origin part 6b is located on a circumferential line on the inner peripheral face 2c at the center part in the axial direction of the inner ring 2. Thus, the inclined groove 6 has a symmetrical shape in the axial direction of the inner ring 2 relative to the circumferential line (the center line X in the axial direction of the roller bearing 1).

Distal ends 6a of each inclined groove 6 are located in the vicinity of the opposite ends of the inner peripheral face 2c. The inclined grooves 6 are arranged with a constant interval along the inner peripheral face while directing the distal ends 6a to the same direction.

The number of the inclined grooves 6 is larger than the number of the oil holes 5, so that the oil holes 5 communicate with the origin parts 6b of some of the inclined grooves 6.

The roller bearing 1 is mounted on the roll R in such a manner that the inclined grooves 6 of the inner ring 2 extend in a forward direction with respect to a rotational direction A of the roll R, that is, the distal ends 6a of the inclined grooves 6 are directed to the rotational direction A of the roll R relative to the origin part 6b.

In the roller bearing 1 of the above construction, grease supplied from the grease supplying path H1 of the housing H to the area between the outer ring raceway surface 3b and the inner ring raceway surface 2b via the groove 7d, the holes 7c, the groove 3d and the holes 3e is pressed by the plurality of cylindrical rollers 4 in accordance with the rolling movement of these cylindrical rollers 4, and is forced out to the inner peripheral face 2c of the inner ring 2 through the oil holes 5. As a result, the grease is supplied to the area between the inner peripheral face 2c of the inner ring 2 and the journal portion S, and this supplied grease is delivered to the plurality of inclined grooves 6 formed in the inner peripheral face 2c of the inner ring 2, and is guided toward the opposite ends of the inner peripheral face 2c in the axial direction of the inner ring 2. Therefore, the outer peripheral face of the journal portion S and the inner peripheral face 2c of the inner ring 2 can be restrained from being worn by the creep.

Particularly in the above embodiment, since the lubrication grooves in the inner peripheral face 2c of the inner ring 2 are formed by the V-shaped inclined grooves 6, the grease supplied to the area between the journal portion S and the inner peripheral face 2c of the inner ring 2 can be efficiently flowed from the origin parts 6b of the inclined grooves 6 toward the distal ends 6a in accordance with the relative rotation of the journal portion S and the inner ring 2 occurred due to the creep. Namely, at the time of occurrence of the creep when the journal portion S rotates precedingly relative to the inner ring 2, the grease guided into the inclined groove 6 is caused to follow the journal portion S by its viscous resistance, and can be flowed toward the distal ends 6a of the inclined groove 6. Therefore, the grease can be efficiently guided over the entire length from the origin parts 6b of the inclined grooves 6 toward the distal ends 6a. Accordingly, the inner peripheral face 2c of the inner ring 2 can be efficiently lubricated generally over the entire area thereof by this grease.

Figure 3:
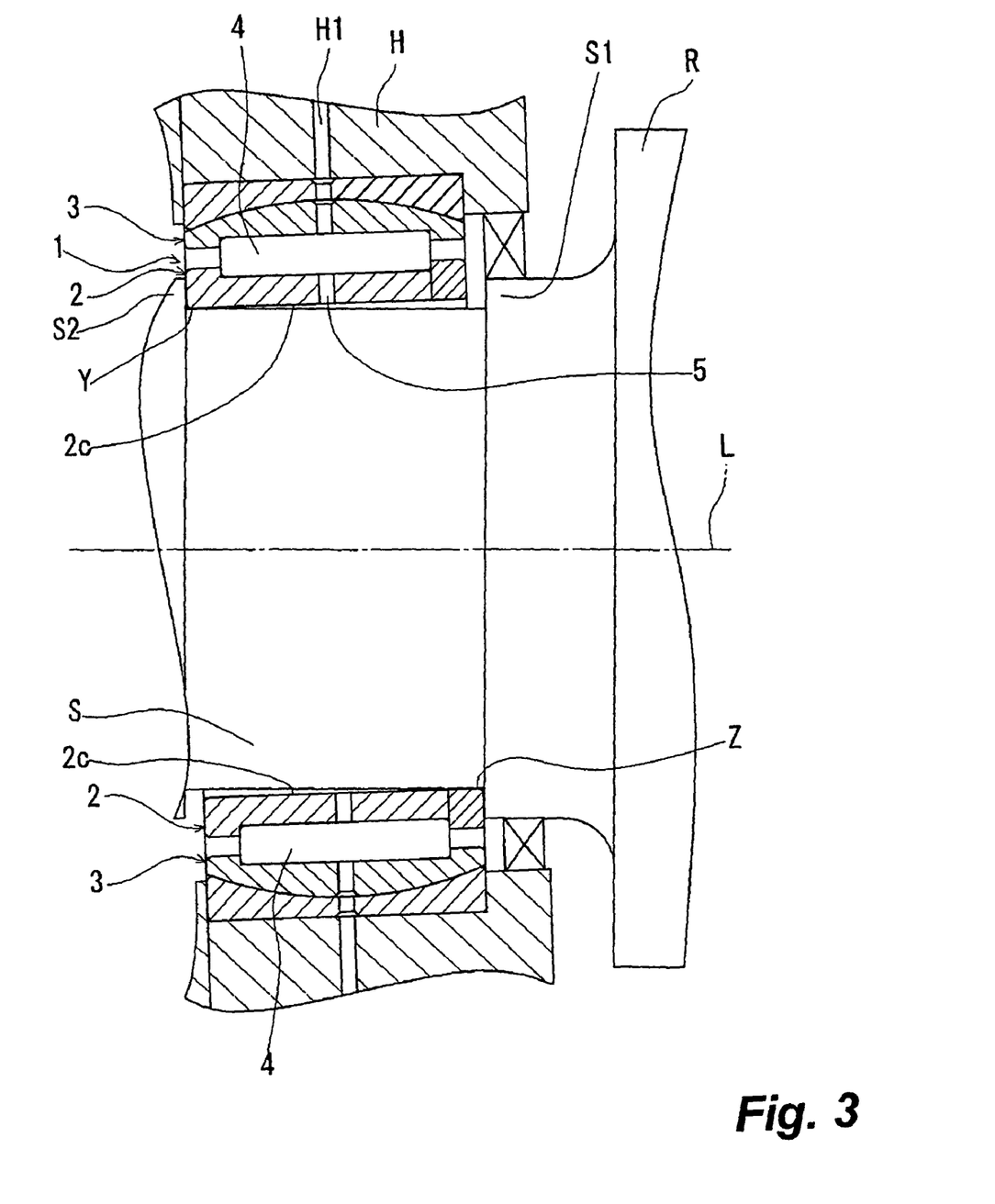
FIG. 3 is a schematic view showing a state that a roll is deflected.

And besides, axis L of the roll R in the continuous casting installation is deflected by the load, so that larger loads act on an upper portion Y of a left end edge (in FIG. 3) of the inner peripheral face 2c of the inner ring 2 and a lower portion Z of a right end edge (lower face side of the journal portion S) disposed 180 degrees out of phase with this upper portion. However, in this embodiment, the grease can be efficiently supplied also to the distal ends 6a of the inclined grooves 6, and therefore a good lubrication between each of the left end edge and right end edge of the inner ring inner peripheral face 2c and the journal portion S can be secured. Therefore, the left end edge and right end edge of the inner peripheral face 2c of the inner ring 2, and the outer peripheral face of the journal portion S which are in slide contact can be more effectively restrained from being worn by the creep. In FIG. 3, a clearance between the inner peripheral face 2c of the inner ring 2 and the outer peripheral face of the journal portion S, a clearance between one end face of the inner ring 2 and the step portion S1 of the journal portion S, and a clearance between the other end face of the inner ring 2 and the fixing member S2 fixed to the journal portion S are shown in an exaggerated manner for better understanding.

As described above, in the roller bearing 1, grease supplied to the area between the outer ring raceway face 3b and the inner ring raceway face 2b is forced out to the inner peripheral face 2c of the inner ring 2 through the oil holes 5 in accordance with the rolling movement of the plurality of cylindrical rollers 4, and this forced-out grease is guided toward the opposite ends of the inner peripheral face 2c in the axial direction of the inner ring 2 by the plurality of inclined grooves 6 formed in this inner peripheral face 2c. Accordingly, a high-pressure grease supplying apparatus heretofore required becomes unnecessary. With the simple structure and at low costs, the outer peripheral face of the journal portion S and the inner peripheral face 2c of the inner ring 2 can be effectively restrained from being worn by the creep.

Figure 4:
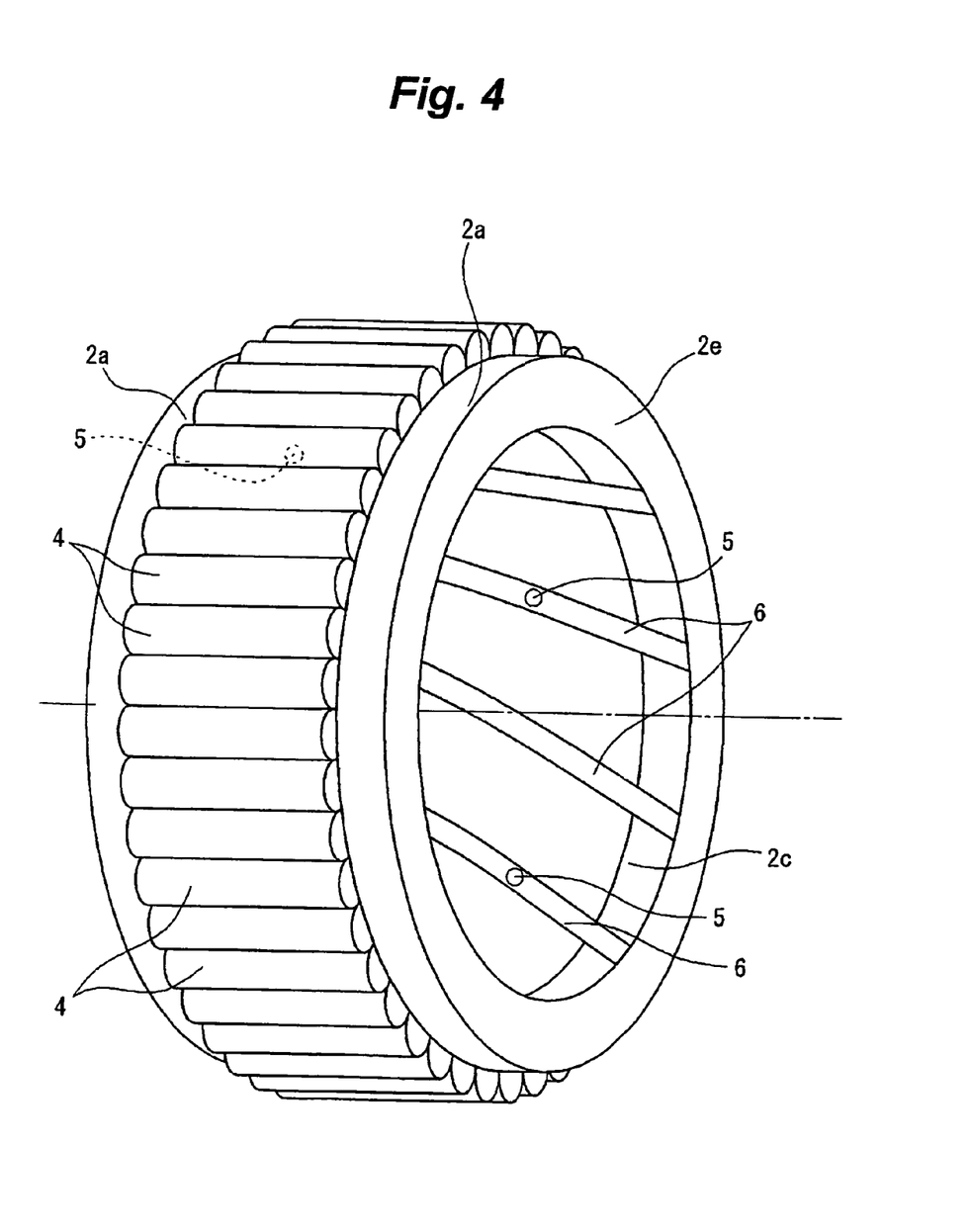
FIG. 4 is a perspective view showing another embodiment of lubrication grooves.

The present invention is not limited to the above embodiment. For example, in the above embodiment, the oil holes 5 are formed in the center part of the inner peripheral face 2c in the axial direction of the inner ring 2. However, they may be formed to be offset from the center part in the axial direction, and the inclined grooves 6 may be formed in an asymmetrical shape accordingly. Furthermore, the invention can be carried out by making various changes such as by using, instead of the V-shaped inclined grooves 6 serving as the lubrication grooves, straight grooves parallel to the generatrix of the inner peripheral face 2c of the inner ring 2 or, as shown in FIG. 4, grooves extending from one end portion to the other end portion of the inner peripheral face 2c of the inner ring 2 while intersecting with the generatrix.

Furthermore, although the above embodiment has illustrated the case where the present invention is applied to the full complement cylindrical roller bearing provided with the aligning housing ring, the invention can be carried out even when it is applied to other roller bearings such as a cylindrical roller bearing provided with a cage, a self-aligning roller bearing and a cylindrical roller bearing with no aligning ring.

The inclined grooves 6 may be formed only in the inner peripheral face 2c of the inner ring 2 and may not be formed in the inner peripheral face of the loose rib 2e.

The invention claimed is:

1. A roller bearing, comprising:
an inner ring, comprising an outer peripheral face provided with an inner ring raceway surface and an inner peripheral face adapted to be clearance-fitted with a rotary shaft;
an outer ring, disposed coaxially with the inner ring at an outside in a radial direction of the inner ring, the outer ring comprising an inner peripheral face provided with an outer ring raceway surface; and
a plurality of rollers, the plurality of rollers being rollably disposed between the inner ring raceway surface and the outer ring raceway surface,
wherein the roller bearing is configured to supply grease to an area between the inner ring raceway surface and the outer ring raceway surface,
wherein the inner ring is formed with an oil hole defined therein extending through a part between the inner ring raceway surface and the inner peripheral face of the inner ring, and configured to feed the grease, which has been supplied to the area between the inner ring raceway surface and the outer ring raceway surface, to the inner peripheral face of the inner ring in accordance with a rolling of the rollers,
wherein the inner peripheral face of the inner ring is formed with a plurality of lubrication grooves defined therein, the plurality of lubrication grooves being configured to guide the grease, which has been fed to the inner peripheral face of the inner ring through the oil hole, to opposite end portions of the inner peripheral face in an axial direction of the inner ring,
wherein the lubrication grooves comprise inclined grooves each comprising two portions extending toward the opposite end portions of the inner peripheral face in the axial direction of the inner ring, and
wherein the plurality of inclined grooves extend in a forward direction with respect to a rotational direction of the roller bearing.

2. The roller bearing as set forth in claim 1, wherein the lubrication grooves are
inclined relative to a generatrix of the inner peripheral face of the inner ring from an origin part located at a position corresponding to a position in the axial direction of the inner ring where the oil hole is formed, and
wherein the inclined grooves are arranged with a predetermined interval in a circumferential direction of the inner peripheral face of the inner ring while being directed to the same direction.

3. The roller bearing as set forth in claim 2, wherein the oil hole is formed at a center part in the axial direction of the inner ring, and
wherein the inclined grooves extends symmetrically toward the opposite end portions in the axial direction of the inner ring front the center part in the axial direction of the inner ring, as the origin part.

4. A roller bearing apparatus, comprising:
a journal portion;
an inner ring configured to rotate relative to the journal portion, the inner ring comprising a plurality of oil holes formed therein at a center part in an axial direction of the inner ring, and a plurality of inclined grooves extending symmetrically toward opposite end portions in the axial direction of the inner ring from the center part in the axial direction of the inner ring as an origination part of the plurality of inclined grooves;

an outer ring concentrically formed outside of the inner ring in a radial direction of the inner ring; and a plurality of rollers formed between the inner ring and the outer ring, wherein a grease is fed to the plurality of inclined grooves through the plurality of oil holes and to an inner peripheral face of the inner ring in the axial direction, and wherein the plurality of inclined grooves extend in a forward direction with respect to a rotational direction of the roller bearing.

5. The roller bearing apparatus according to claim 4, wherein each of the plurality of inclined grooves are inclined relative to a generatrix of the inner peripheral face of the inner ring.

6. The roller bearing apparatus according to claim 4, wherein a number of the plurality of inclined grooves is greater than a number of the plurality of oil holes.

7. The roller bearing apparatus according to claim 4, wherein the origination part comprises one of a plurality of origination parts, and each one of the plurality of oil holes communicates with more than one of the origination parts of the plurality of inclined grooves.

8. The roller bearing apparatus according to claim 4, wherein, during a rotation of the roller bearing, the grease is guided into the plurality of inclined grooves and to follow the journal portion by a viscous resistance of the grease.

9. The roller bearing apparatus according to claim 4, wherein an inner diameter of the inner peripheral face of the inner ring is configured to be within a clearance fitting distance with respect to an outer diameter of the journal portion.

\* \* \* \* \*